Aug. 20, 1929.  C. B. COMSTOCK  1,724,908
TRAVELING CONVEYER FOR BAKERS' OVENS AND TRACKS THEREFOR
Filed Feb. 2, 1926   2 Sheets-Sheet 1
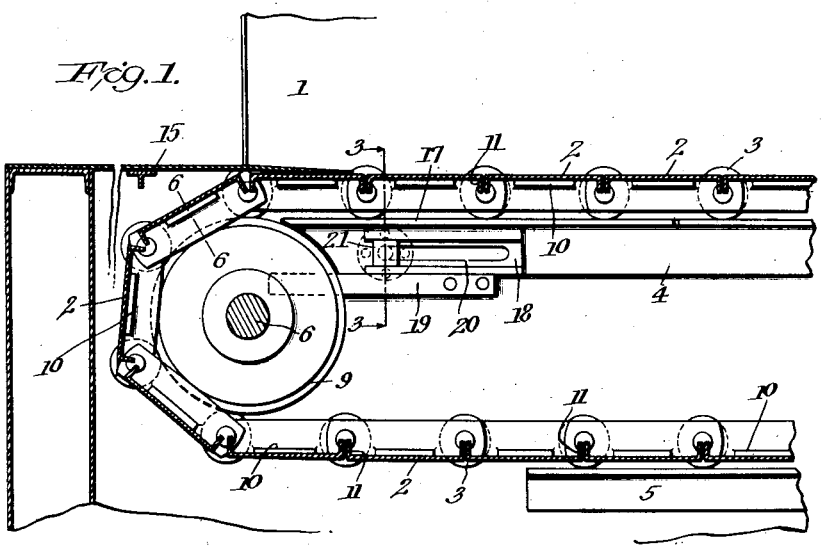
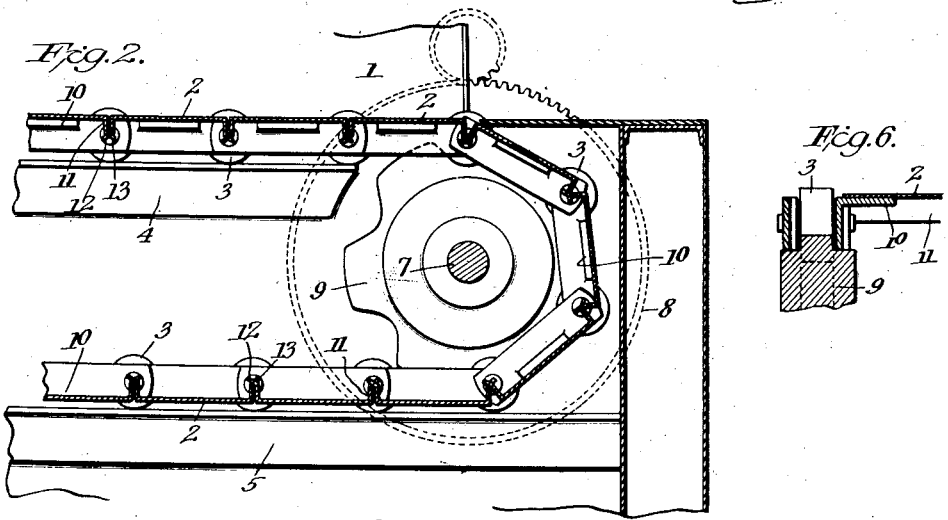
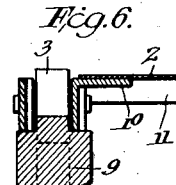
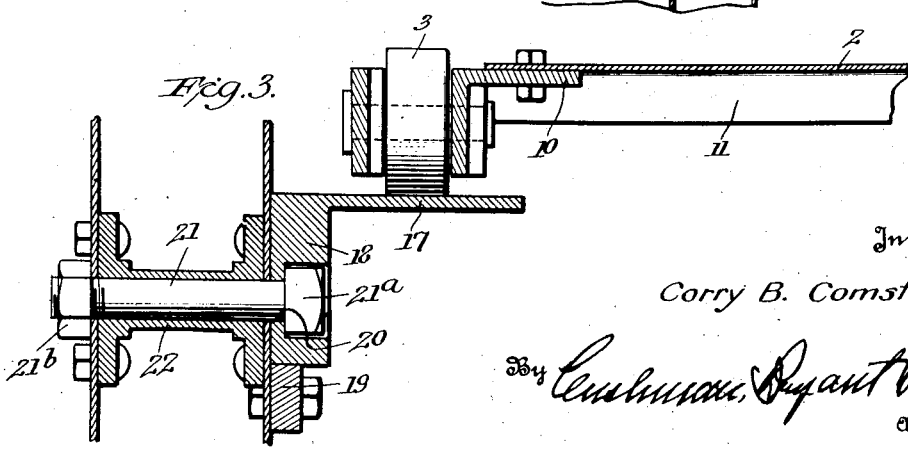
Inventor
Corry B. Comstock Aug. 20, 1929.

C. B. COMSTOCK 1,724,908

TRAVELING CONVEYER FOR BAKERS' OVENS AND TRACKS THEREFOR

Filed Feb. 2, 1926       2 Sheets-Sheet 2

Inventor
Corry B. Comstock

Patented Aug. 20, 1929.

1,724,908

UNITED STATES PATENT OFFICE.

CORRY B. COMSTOCK, OF NEW YORK, N. Y., ASSIGNOR TO COMSTOCK OVEN COMPANY, INC., OF NEW YORK, N. Y., A CORPORATION OF NEW YORK.

TRAVELING CONVEYER FOR BAKERS' OVENS AND TRACKS THEREFOR.

Application filed February 2, 1926. Serial No. 85,517.

The present invention relates to improvements in bakers' ovens, and particularly to the construction of the endless conveyer by which the loaves of bread or cake are moved longitudinally through a baking chamber, and a track for supporting such conveyer.

More particularly the invention relates to improvements in the type of conveyer in which the conveyer flights are of plate-like form so connected to endless traveling chains that they are adapted to form a substantially continuous surface throughout the length of the baking chamber. With the constructions heretofore commonly employed conveyers of this type have not proven entirely satisfactory in the baking of what is known as "bottom bread", in which the loaves are supported directly on the conveyer while being baked. One of the principal objections to the forms of conveyer heretofore employed in bakers' ovens has been that it is practically impossible to maintain the desired horizontal alignment of the several flights in their travel through the baking chamber, and when one or more of the flights becomes distorted or displaced from exact horizontal alignment with the adjacent flights, it will be evident that a defect may be produced in the lower faces of the loaves supported by such flights.

A further objection to the conveyers of the type referred to, as commonly constructed, and the supporting tracks therefor is that as it is necessary to provide means for adjusting the endless chain supporting means at one end of the oven longitudinally of the oven to maintain the conveyer chains under the desired tension a considerable space frequently occurs between said supporting means and the adjacent ends of the rails of the track. The relative movement of the flights in passing around the sprockets or pulleys adjacent said space at the feed end of the baking chamber tends to produce gaps between the edges of adjacent flights, the subsequent closing of which, as the flights come into substantial horizontal alignment, acts to pinch or mar the loaves deposited thereon in the baking of so-called "hearth" or "bottom" bread.

The conveyer being unsupported immediately adjacent the points at which the flights leave the rotary supporting means at the feed end of the oven, and said rotary means commonly being in the form of sprockets the flights necessarily assume a slightly inclined position between said sprockets and the adjacent ends of the track within the oven.

Such inclination of the flights also interferes with maintaining the articles to be baked, particularly pies, in the horizontal position which is desirable.

By the construction and arrangement of parts hereinafter particularly described, both of the objections above noted that have characterized conveyers of the same general type in bakers' ovens are avoided.

In the accompanying drawings:—

Figure 1 is a vertical sectional view of a portion of a baker's oven, provided with a conveyer and track constructed in accordance with the present invention, the view being taken substantially on the line 1—1 of Figure 4.

Figure 2 is a similar view of the opposite end of the oven, the section being taken substantially on the line 2—2 of Figure 4.

Figure 3 is a transverse section, substantially on the line 3—3 of Figure 1, on an enlarged scale.

Figure 6 is a detail section, substantially on the line 6—6 of Figure 1.

Figure 4:
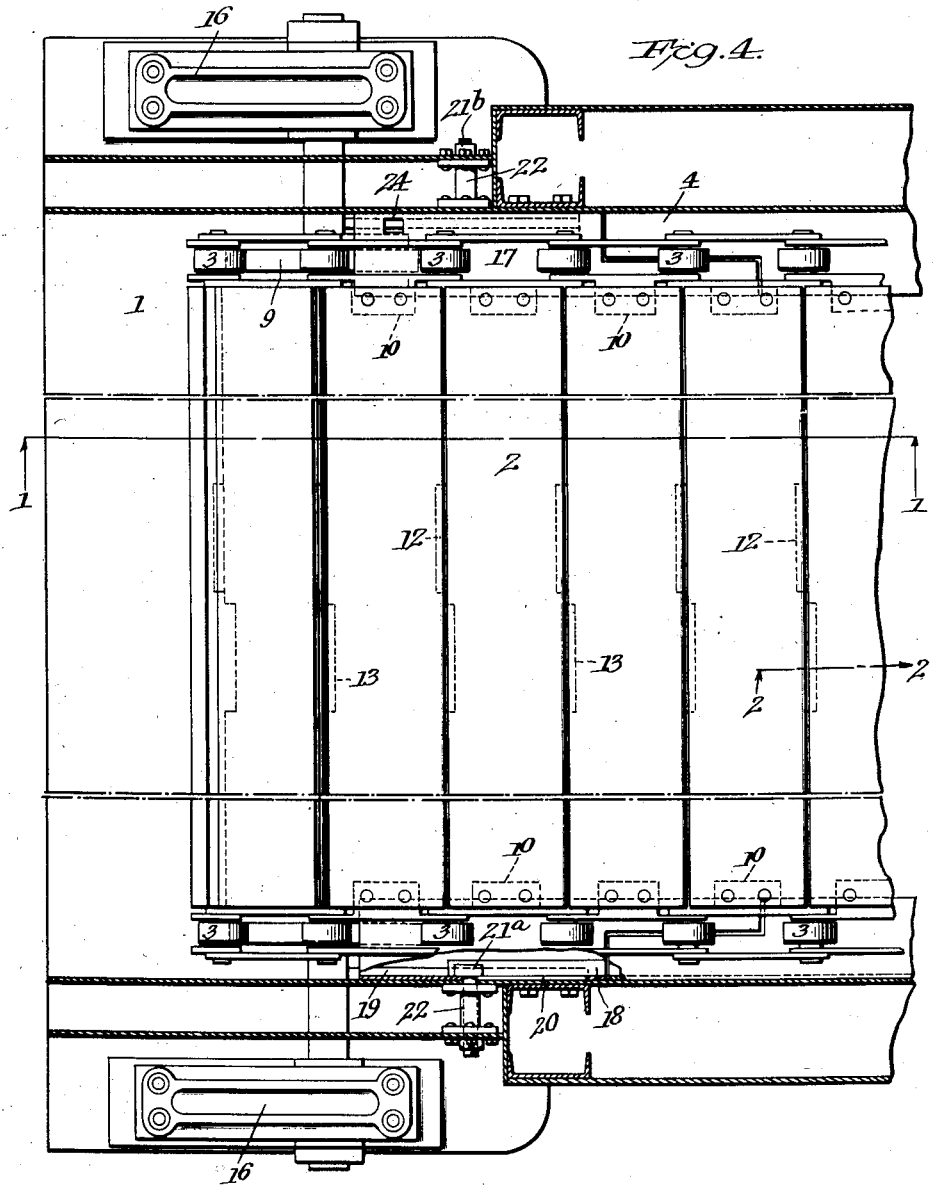
Figure 4 is a plan of the parts at the inlet or feed end of the baking chamber.

Referring to the drawings, in the several views of which like reference characters indicate corresponding parts, 1 designates a portion of the baking chamber of a baker's oven, through which the bread, cake or pie to be baked is transported by a conveyer that comprises two parallel roller chains connected by plate-like flights 2, and the rollers 3 of which are supported by and travel along suitable tracks that are preferably secured to opposite side walls of the oven.

The drawing illustrates more or less conventionally a conveyer of this general type, in which the endless roller chains are supported by two tracks arranged one above the other, and respectively including stationary rail sections 4, 5. The chains are additionally supported by shafts 6, 7, journalled in suitable bearings arranged respectively at opposite ends of the oven, the shaft 7 adjacent the delivery end being preferably provided with driving sprockets 8 and a suitable gear train by which it may be positively rotated.

The chain supporting means on the shaft 6 adjacent the inlet or feed end of the baking chamber is shown as being a toothless wheel 9 of the cross sectional form shown in Figure 6, and the bearings for this shaft 6 are so mounted that they may be bodily adjusted toward or from the baking chamber to maintain the conveyer chains taut and under the desired tension.

As there can, of course, be considerable modification with regard to the details of the means for propelling the conveyer chains and adjusting the tension thereof, as above referred to, and these parts of themselves do not constitute features of the present invention, the illustration thereof is more or less conventional and diagrammatic.

As shown, the flights 2 of the conveyer are preferably formed of metal plates, each being of sufficient length to extend from one of the endless chains to the other, and, as shown, being secured by bolts or rivets to lugs 10 extending inward from links of said chains.

The sides of the flights 2 are bent to extend substantially at right angles to the body of the plate, and in such direction that when the flights are traversing the upper runs of the endless chains said flanges 11 will extend downward. The flights are of such width that the flanges 11 thereon are situated relatively close together so that a practically continuous horizontal surface is provided to receive the articles to be baked and transport them from the feed end of the baking chamber to the delivery or discharge end thereof.

Figure 5:
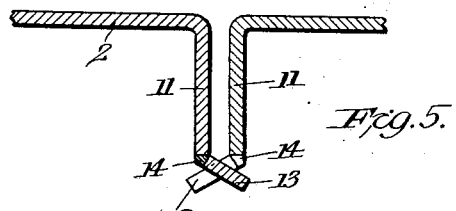
Figure 5 is a sectional detail, on an enlarged scale, of portions of two adjacent conveyer plates.

To insure that the bodies of the plate-like flights will be maintained in the desired horizontal alignment, the lower edge of each side flange thereof is preferably provided with a lug 12, 13, that extends outward at an oblique angle to the plane of said flange and beneath the lower edge of the adjacent flange of the next flight in the series. As shown particularly in Figure 4, the lugs 12, 13, at opposite sides of each flight are arranged out of alignment or in staggered relation as regards the length of the flight. Preferably these lugs are welded to the lower edges of the flanges 11, as indicated at 14 in Figure 5. As shown in Figure 4, each lug is of such length that there is provided a considerable area of contact between said lugs and the edges of the flanges 11.

It will be evident from the foregoing description, and an inspection of the drawings, that the lugs 12, 13, effectively prevent any material distortion of any of the flights 2 from a horizontal position and provide the conveyer with a substantially continuous flat horizontal surface particularly adapted to the baking of "hearth" or "bottom" bread.

As customary in bakers' ovens of the character or type referred to, the shaft 6 and chain supporting means thereon are so positioned that the adjacent ends of the conveyer chains extend beyond the inlet or feed opening of the oven, a table-like support 15 being provided over such projecting portion of the conveyer on which the bread is initially placed and from which it is delivered onto the conveyer within the baking chamber. As before noted, the shaft 6 is customarily so supported that it can be bodily shifted relative to the oven frame to maintain the conveyer chains under the desired tension, a portion of such adjusting means being conventially illustrated at 16.

As heretofore constructed, there has always existed a considerable gap between the chain supporting means on the shaft 6 and the adjacent ends of the upper track rails 4. This gap or space is frequently of a length greater than that of any of the individual links of the conveyer chains, and such chains therefore have been unsupported at points between that at which the chain rollers leave the wheel and where they come into engagement with the track rails 4.

According to the present invention means are provided whereby this gap is bridged by a supplemental track having rails forming continuations or extensions of the fixed rails 4 and by means of which all of the conveyer chain links will have a firm support from the wheel 9 throughout the length of the baking chamber.

This supplemental track section comprises two rails, each including a horizontal flange portion 17 and a depending web or flange 18. The lower edges of the webs 18 rest upon stationary supports 19 secured by bolts, rivets or other means to the framework of the oven, and in each of said vertical webs or flanges 18 is formed a longitudinally extending slot 20. A securing bolt 21 is provided in cooperation with each supplemental rail section for holding said section rigidly in any adjusted position. As shown particularly in Figure 3, such bolt has at one end an enlarged head 21$^a$, which is received in the slot 20 of the depending flange 18 of the supplemental rail and said bolt extends through a suitable spacing sleeve 22 secured to members of the oven frame, and on its other end is arranged a nut 21$^b$. By loosening this nut it is possible to move the supplemental rail section longitudinally to provide for variations in the length of the gap or space which separates the adjacent ends of the fixed rails 4 from the chain supporting means on the shaft 6.

Preferably each supplemental rail section is provided in its horizontal flange member with an aperture 24 with which a suitable hook, inserted through the feed or inlet opening of the baking chamber, may be engaged and employed to draw the supplemental rail section outward as may be necessary when the shaft 6 is bodily moved as before described.

The horizontal flange 17 of each supplemental track rail is of substantially the same width as the top flange of the stationary rail 4. The meeting ends of these rails are made of step form and arranged in overlapping relation, as shown in Figure 4. From this figure it will be seen that the longitudinal division between the rail sections 4 and 17 is about midway of the width of each chain roller circumference, and therefore, even if the rail section 17 should be drawn forward sufficiently to provide a considerable gap between the innermost portion of the end thereof and the adjacent portion of the rail 4, the chain rollers will be at all times supported by a relatively stationary surface. When the parts are positioned as shown in Figure 4, the chain rollers will have a fixed contact surface throughout their entire width, but if the track section 17 should be drawn forward very materially the rollers will be supported during a part of their travel solely by the inward extension of the supplemental rails and during a further portion of their movement by the outer end section of the fixed rail 4.

As previously noted, it is preferred to support the endless chains of the conveyer adjacent the feed end of the oven by toothless wheels instead of sprockets which have been commonly used.

The wheels 9, one for each chain of the conveyer, are each provided with a medially positioned peripheral rib on which the rollers 3 of the chains bear and on opposite sides of this rib with annular contact surfaces against which the edges of the side bars of the chain links bear. By this construction the strain or pull exerted on the pintles of the chain rollers 3 in passing around the axis of shaft 6 is reduced to a minimum.

It is believed that the operation and advantages of the improvements hereinbefore described will be readily apparent from the description and accompanying drawings.

It will be understood that the baking chamber may be heated by any suitable means, no special heating devices being shown, and the means for adjusting the chain supporting devices adjacent the inlet or feed end of the baking chamber as well as the power devices for driving the chains are shown conventionally only, as many forms of devices for these purposes can be used with the subject matter of the present invention. The drawings are intended to be illustrative, and not restrictive of the invention and except where particularly specified in the appended claims, it is to be understood that the invention is not limited to the exact details shown.

Having thus described the invention, what is claimed as new is:—

1. In a baker's oven, the combination of a track including two substantially horizontal parallel rails extending longitudinally of the baking chamber, rotatable chain supporting means at the ends of the track, two endless roller chains engaging said supporting means and having the rollers of the upper runs thereof traveling along said rails of the track, and plate-like flights having their ends connected to said chains and their sides bent to form flanges extending substantially at right angles to the body of the flight, and downward therefrom when the flight is traversing the upper runs of the chains, the free edge of each side flange having an outwardly projecting lug that extends across the free edge of the adjacent side flange of the next flight in the series, the line of intersection of lugs from adjacent flights being substantially coincident with the axis of opposite rollers of the conveyer chains.

2. In a baker's oven, the combination of a substantially horizontal track extending longitudinally of the baking chamber and including parallel fixed rails of less length than the oven chamber, rotatable chain supporting means beyond the ends of said track, two endless roller chains engaging said supporting means and having their rollers traveling along said track, plate-like flights having their ends connected to said chains, means for rotating the chain supporting means at one end of the oven to effect movement of the chains and flights through the oven chamber, the chain supporting means at the other end of the oven chamber being bodily adjustable to maintain the chain under the desired tension, and a supplemental track section interposed between the last said chain supporting means and the adjacent ends of the fixed rails of the track and having rails constituting extensions of said fixed rails, the inner ends of the rails of the adjustable track section overlapping the adjacent ends of the fixed rails of the track, and said supplemental track section being bodily adjustable longitudinally independent of the adjustable supporting means for the purpose described.

3. In a baker's oven, the combination of a substantially horizontal track extending longitudinally of the baking chamber and including parallel fixed rails of less length than the oven chamber, rotatable chain supporting means beyond the ends of said track, two endless roller chains engaging said supporting means and having their rollers traveling along said track, plate-like flights having their ends connected to said chains, means for rotating the chain supporting means at the delivery end of the oven to effect movement of the chains and flights through the oven chamber, the chain supporting means adjacent the feed end of the oven being bodily adjustable to maintain the chain under the desired tension, and a supplemental track section arranged beyond the ends of the fixed rails adjacent said feed end of the oven and having rails constituting extensions of said fixed rails, said supplemental track section being supported independently of and adapted to be bodily adjusted relative to both said fixed rails and adjustable chain supporting means, whereby the rollers of the conveyer chains will be supported so that they will leave the chain supporting means at the feed end of the oven on a substantially horizontal line tangent to the circumference of said supporting means.

4. In a baker's oven, the combination of two substantially horizontal tracks arranged one above the other and extending longitudinally of the baking chamber, each track including parallel fixed rails of less length than the oven chamber, rotatable chain supporting means beyond the ends of said tracks, two endless roller chains engaging said supporting means and having their rollers traveling along said tracks, plate-like flights having their ends connected to said chains, means for rotating the chain supporting means adjacent the delivery end of the oven to effect movement of the chains and flights through the oven chamber, the chain supporting means adjacent the feed end of the oven chamber being bodily adjustable to maintain the chain under the desired tension, and a supplemental track section interposed between the last said chain supporting means and the adjacent ends of the fixed rails of the upper track and having rails constituting extensions of said fixed rails, whereby the rollers of the conveyer chains will be supported so that they will leave the chain supporting means at the feed end of the oven on a line tangent to the circumference of said supporting means, said supplemental track section being adjustable longitudinally independent of the chain supporting means to accommodate adjustment of the adjacent chain supporting means.

5. In a baker's oven, the combination of a substantially horizontal track extending longitudinally of the baking chamber and including parallel fixed rails of less length than the oven chamber, rotatable chain supporting means beyond the ends of said track, two endless roller chains engaging said supporting means and having their rollers traveling along said track, plate-like flights having their ends connected to said chains, means for rotating the chain supporting means at one end of the oven to effect movement of the chains and flights through the oven chamber, the chain supporting means at the other end of the oven chamber being bodily adjustable to maintain the chain under the desired tension, stationary supports in the space between the feed end of the oven and the adjacent ends of the fixed track rails, supplemental rails, constituting extensions of the fixed rails, resting on and adapted to be adjusted longitudinally of said supports, independent of the chain supporting means and means for holding said supplemental rails stationary in any adjusted position on said supports.

6. In a baker's oven, the combination of a substantially horizontal track extending longitudinally of the baking chamber and including parallel fixed rails of less length than the oven chamber, rotatable chain supporting means beyond the ends of said track, two endless roller chains engaging said supporting means and having their rollers traveling along said track, plate-like flights having their ends connected to said chains, means for rotating the chain supporting means at one end of the oven to effect movement of the chains and flights through the oven chamber, the chain supporting means at the other end of the oven chamber being bodily adjustable to maintain the chain under the desired tension, stationary supports in the space between the feed end of the oven and the adjacent ends of the fixed track rails, supplemental rails, constituting extensions of the fixed rails, each having a depending longitudinally slotted portion resting on and adapted to move longitudinally of said supports, and bolts connected with the oven frame and extending through said slotted portions of the supplemental rails for holding said rails stationary in any adjusted position on said supports.

7. In a baker's oven, the combination of a substantially horizontal track extending longitudinally of the baking chamber and including parallel fixed rails of less length than the oven chamber, rotatable chain supporting means beyond the ends of said track, two endless roller chains engaging said supporting means and having their rollers traveling along said track, plate-like flights having their ends connected to said chains, means for rotating the chain supporting means at one end of the oven to effect movement of the chains and flights through the oven chamber, the chain supporting means at the other end of the oven chamber being bodily adjustable to maintain the chain under the desired tension, longitudinally adjustable supplemental rails within the space between the fixed rails and the feed end of the oven, the roller bearing surfaces of the meeting ends of the fixed and supplemental rails being reduced in width and arranged in overlapping relation, and means for holding the supplemental rails stationary in any adjusted position.

8. In a baker's oven, the combination of a substantially horizontal track extending longitudinally of the baking chamber and including parallel fixed rails of less length than the oven chamber, a shaft extending transversely of the oven chamber adjacent the delivery end thereof, sprockets on said shaft, a second transverse shaft adjacent the feed end of the oven, toothless wheels on said second shaft in substantial alignment with the sprockets on the shaft adjacent the other end of the oven, and each having a medially positioned annular rib, two endless roller chains extending about said sprockets and wheels, the rollers of said chains contacting with the peripheral ribs on said wheels and the side bars of the links contacting with peripheral surfaces of said wheels on opposite sides of said ribs, the wheel supporting shaft being bodily adjustable to maintain the chains properly taut, flights connecting the chains, means for driving the sprocket shaft, and a supplemental track within the space between said chain supporting wheels at the feed end of the oven and the fixed track, for the purpose described.

In testimony whereof I have hereunto set my hand.

CORRY B. COMSTOCK.